July 28, 1931.  S. A. MOSS  1,816,737
SUPERCHARGER FOR INTERNAL COMBUSTION ENGINES
Original Filed July 27, 1925  2 Sheets-Sheet 1

Inventor:
Sanford A. Moss,
by
His Attorney.

July 28, 1931.  S. A. MOSS  1,816,737
SUPERCHARGER FOR INTERNAL COMBUSTION ENGINES
Original Filed July 27, 1925  2 Sheets-Sheet 2

Inventor:
Sanford A. Moss,
by
His Attorney.

Patented July 28, 1931

1,816,737

UNITED STATES PATENT OFFICE

SANFORD A. MOSS, OF LYNN, MASSACHUSETTS, ASSIGNOR TO GENERAL ELECTRIC COMPANY, A CORPORATION OF NEW YORK

SUPERCHARGER FOR INTERNAL COMBUSTION ENGINES

Application filed July 27, 1925, Serial No. 46,252. Renewed August 11, 1930.

The present invention relates to superchargers for internal combustion engines and especially to superchargers of the type comprising a centrifugal compressor driven by a turbine which is actuated by exhaust gases from the engine.

The object of my invention is to provide an improved method of regulating a supercharger of this type and an improved construction and arrangement for carrying out such methods.

For a consideration of what I believe to be novel and my invention attention is directed to the accompanying description and the claims appended thereto.

Figure 1:
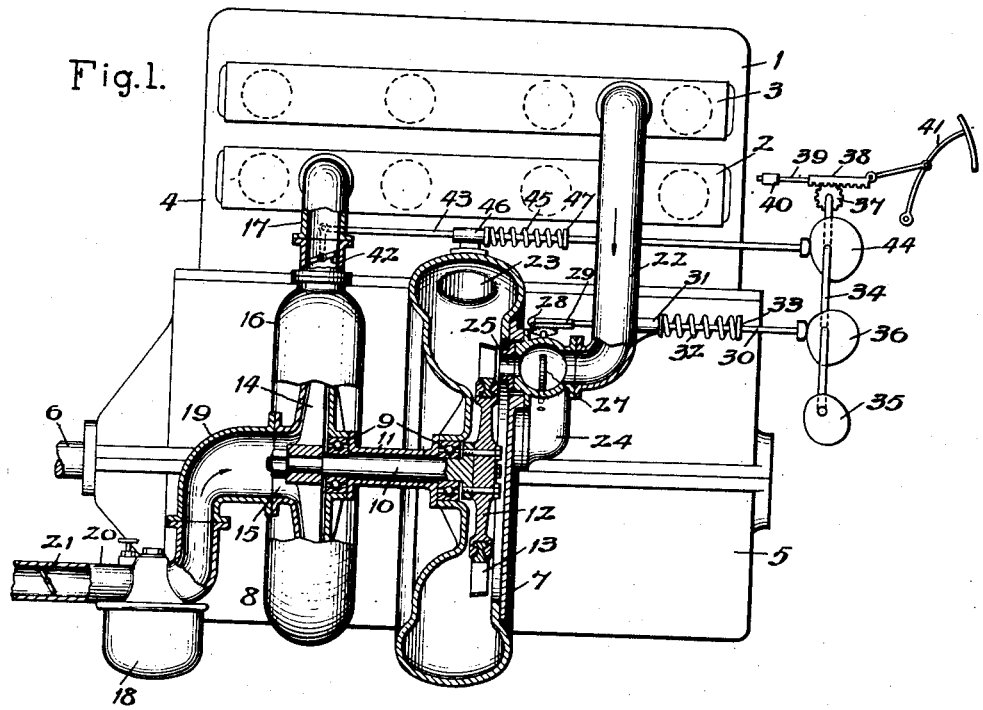
Figure 2:
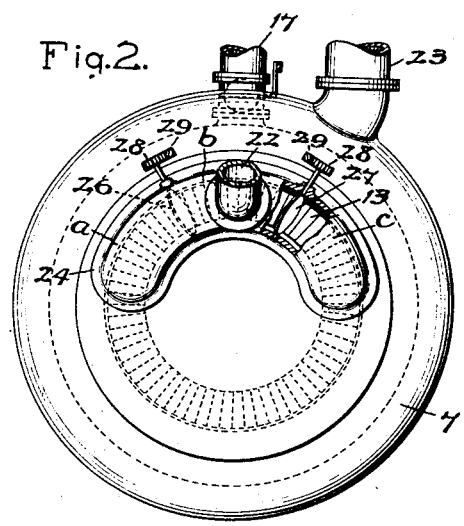

In the drawings, Fig. 1 is a side elevation of an internal combustion engine provided with a supercharger embodying my invention, the supercharger being shown in section; Fig. 2 is an end view of the supercharger, and Fig. 3 is a view similar to Fig. 1 of a modification.

Figure 3:
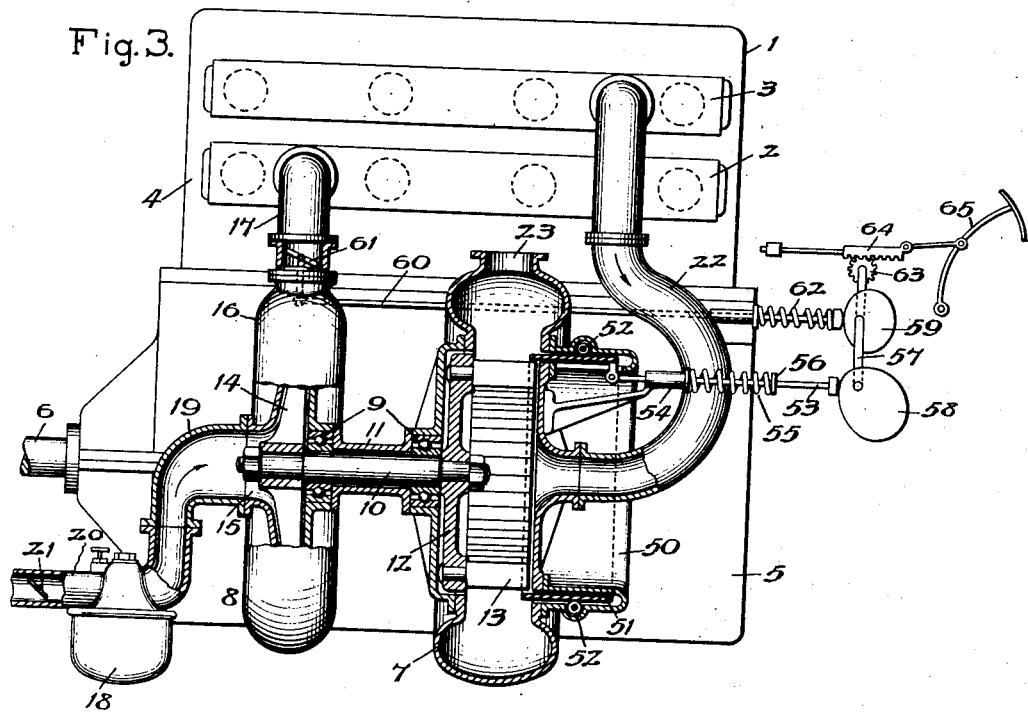

Referring to the drawings, Figs. 1, 2 and 3, 1 indicates an internal combustion engine of any suitable type. For example it may be an aeroplane or automobile engine, and may comprise any suitable number of cylinders. 2 indicates the intake manifold of the engine, 3 the exhaust manifold, 4 the cylinder block, 5 the crank case, and 6 the crank shaft.

Mounted adjacent to the engine in any suitable manner is a supercharger comprising a turbo-compressor driven by exhaust gases from the engine. It comprises a turbine casing 7 and a compressor casing 8 provided with bearings 9 in which is mounted a shaft 10, the two casings being joined by a sleeve 11 through which shaft 10 extends. Mounted on shaft 10 inside turbine casing 7 is a turbine wheel or rotor 12 provided with a ring of buckets 13, and mounted on shaft 10 inside compressor casing 8 is an impeller wheel 14. Compressor casing 8 is provided with an inlet 15 through which air is supplied to the eye of the impeller, and with a discharge scroll 16 into which the impeller discharges. Discharge scroll 16 is connected by a conduit 17 to the intake manifold 2. Adjacent to the compressor is a carburetor 18 connected by a conduit 19 to compressor inlet 15. Carburetor 18 is indicated only diagrammatically and may be of any suitable type and may be supplied with fuel in any suitable manner. Its air intake is indicated at 20. With this particular arrangement the air passes first through the carburetor and is carbureted after which the carbureted air is compressed by the supercharger and supplied to the engine. In conduit 20 is a butterfly valve 21 which forms a choke valve and which may be provided with any suitable type of controlling and adjusting means. Exhaust gases from the engine are supplied to the turbine to actuate it by a conduit 22 which leads from exhaust manifold 3 to turbine casing 7. Also connected with turbine casing 7 is an exhaust conduit 23 through which the gases are discharged after having performed work on the turbine wheel.

The exhaust gas-driven turbo-supercharger so far described is shown only by way of example and is to be taken as typical of any suitable supercharger structure of this type.

My present invention relates particularly to the method of and the means for controlling the operation of the turbine whereby with the available supply of exhaust gases, different degrees of supercharging may be obtained. In other words, it relates to the method of and the means for regulating the speed of turbine, it being understood that the amount of supercharging increases with the speed at which the supercharger is driven.

In this connection, a peculiar and unusual problem is presented and one not met with in ordinary turbine practice. There is available an abundance of gases with which to operate the turbine. These gases exhaust from the engine at substantially the pressure of the surrounding atmosphere so that to obtain from them energy for operating the turbine it is necessary to build up a back pressure on the engine to provide the required drop in pressure through the turbine to effect its operation. However, it is desirable to maintain as low a back pressure on the engine as possible because the efficiency of the engine decreases with increase in the back pressure. The problem is, therefore, to operate the superchanger to obtain the desired degree of supercharging but at the same time to impose the least possible pressure on the engine.

Heretofore, in regulating gas-driven turbo-superchargers, it has been the practice to provide an exhaust conduit for the engine discharging directly to the atmosphere and also a conduit leading to the turbine, a valve being provided in the former exhaust conduit for throttling and thereby diverting gases to the conduit leading to the turbine. With this arrangement, when the throttle valve in the atmospheric conduit is wide open, substantially all the gases escape through it directly to atmosphere, little passing through the turbine wheel. As the throttle valve is gradually closed, the exhaust gases are directed in larger and larger quantities to the turbine to effect its operation at higher and higher speeds, the back pressure on the engine being at the same time gradually increased. With this arrangement, a back pressure is imposed on the engine of a value such that the portion of the gases passing through the turbine will operate it at the desired speed.

Now according to my invention, I pass all the exhaust gases from the engine through the turbine all the time and I regulate the turbine by regulating the bucket area acted upon by the gases, the bucket area being decreased to effect an increase in the power and the rate of supercharging, and the bucket area being increased to effect a decrease in the power and the rate of supercharging. This arrangement has the advantage that the energy of all the exhaust gases is being used all the time so that for a given degree of supercharging, the minimum amount of back pressure is imposed on the engine. At the same time, the turbine serves also as an efficient muffler for engines.

In carrying out my invention, I provide a total active bucket area such that when all of it is supplied with exhaust gases, the area will be so large that the drop in pressure through it will be of small value and hence but little turning movement will be imparted to the turbine wheel. In fact under these conditions, the turbine will function primarily as a muffler for the engine and also as a means to rotate the impeller, for mixing the gasoline in cases where the gasoline is supplied to the air in advance of the supercharger, and will subject the engine to a minimum back pressure. I then provide means whereby the active bucket area may be gradually decreased to a certain minimum value at which value the maximum degree of supercharging will be obtained, and the maximum back pressure imposed on the engine.

My invention may be carried out in connection with a turbine of either the impulse or reaction type, an arrangement embodying an impulse turbine being shown in Figs. 1 and 2, and an arrangement embodying a reaction turbine being shown in Fig. 3.

Referring now specifically to Figs. 1 and 2, 24 indicates a nozzle box which may be of any suitable shape. Conduit 22 connects with it and conveys exhaust gases from the engine to it. Nozzle box 24 is provided with nozzles 25 which cover an arc of the turbine wheel buckets and serve to direct the gases from the nozzle box to the buckets. These are nozzles suitable for an impulse turbine and designed to meet the service of the particular conditions present. Nozzles 25 are divided into a plurality of groups, three groups indicated at $a$, $b$ and $c$ being shown in the present instance, by valves 26 and 27. Conduit 22 communicates directly with nozzle group $b$ but communicates with groups $a$ and $c$ by way of valves 26 and 27. Valves 26 and 27 may be of any suitable type and may be operated in any suitable manner. In the present instance they are shown as being butterfly valves carried by stems pivoted in walls of the nozzle box. On the ends of the stems are pinions 28 with which mesh racks 29 formed on the ends of rods 30. Rods 30 are carried in guides 31 and are biased to positions wherein valves 26 and 27 are open, by springs 32 located between the guides and collars 33 on the rods. At 34 is a shaft journaled in suitable bearings (not shown) and provided with cams 35 and 36, one for each rod 30. The ends of rods 30 are held in engagement with cams 35 and 36 by the springs 32. Shaft 34 has a pinion 37 at one end with which meshes a rack 38 on the end of an actuating rod 39. At 40 is indicated a guide for rod 39. Connected to rack 38 is an actuating means 41, here shown as being in the form of a foot pedal. In the case of an automobile, for example, this may be the accelerator pedal for the usual engine throttle valve. The engine throttle valve is indicated at 42. Connected to it is an operating rod 43 which is moved by a cam 44 on shaft 34. A spring 45, arranged between a guide 46 for rod 43 and a collar 47 on rod 43, serves to bias valve 42 toward closed position and the end of rod 43 to a position wherein it is in engagement with cam 44.

Cams 35, 36 and 44 are offset relatively to each other, the arrangement being such that when rod 34 is turned, cam 44 first opens the throttle valve 42 and following this cams 36 and 37 close successively valves 26 and 27, the one being closed in advance of the other. In Fig. 1, shaft 34, the cams thereon, and the operating means for the shaft are shown only diagrammatically and also in somewhat distorted relation as referred to the remainder of Fig. 1, this being for the purpose of more closely illustrating the construction and mode of operation. Any suitable specific operating means for accomplishing the desired function may be used.

When the engine is idling, the parts are in the positions shown in Fig. 1 of the drawings, throttle valve 42 being substantially closed and valves 26 and 27 being wide open. Under these conditions all the exhaust gases from the engine pass through conduit 22 to nozzle box 24, and from there through all the groups of nozzles to the turbine wheel and thence to the exhaust conduit 23. At this time because of the large nozzle area through which the exhaust gases flow, there is but little drop in pressure through the nozzles. The turbine wheel will be rotated only at a comparatively low speed and will produce little if any supercharging of the engine.

The engine will operate in the usual manner, air being drawn in through carburetor 18. After being carbureted and passing through impeller 14, the mixture is discharged from the impeller into discharge scroll 16 from whence it flows through conduit 17 to the engine intake manifold 2. Now, when it is desired to increase the speed and power of the engine, the pedal 41 is moved to turn shaft 34. When shaft 34 is turned, cam 44 comes into action first and gradually opens throttle valve 42. After throttle valve 42 is open or substantially open, cam 36 then comes into action to gradually close valve 27. As valve 27 is closed, the total nozzle area is decreased which means that the pressure of the gases in the nozzle box will be gradually increased due to the fact that a greater pressure will be required in order that they may flow through the nozzle and bucket wheel to atmosphere. As a result more energy will be imparted by them to the turbine wheel, the speed of the turbine wheel will increase, and supercharging will begin to take place. The amount of supercharging will increase as valve 27 is gradually closed. After valve 27 is fully closed, cam 35 comes into action to gradually close valve 26 thereby still further decreasing the nozzle area through which the exhaust gases may flow. After valve 26 is fully closed, the maximum degree of supercharging is obtained.

With the foregoing arrangement, it will be seen that all the exhaust gases from the engine flow through the nozzles and the turbine wheel and are utilized in the actuation of the supercharger. This means that during the operation of the supercharger the back pressure imposed on the engine is a minimum for any operating condition. Also the turbine functions at all times as a muffler for the engine. At the same time, the arrangement results in a compact structure of simple design.

Referring now to Fig. 3, the turbine buckets 13 are shown as extending axially from the wheel 12 and as being of the reaction type. Conduit 22 which conveys the exhaust gases from the engine to the turbine communicates with the turbine casing at its central portion and inside the ring of buckets 13, the gases flowing through the buckets radially outward to the turbine casing and thence through the exhaust conduit 23 to atmosphere. Attached to the turbine casing is a valve housing 50 in which is located an annular valve 51 which slides on suitable rollers 52. Annular valve 51 is adapted to move relatively to bucket ring 13 so as to diminish the area of the bucket ring available for the flow of gases. Connected to annular valve 51 is a rod 53 which moves in a guide 54 and is biased to a position away from the bucket ring 13 by a spring 55 located between one end of guide 54 and a collar 56 on rod 53. At 57 is indicated a shaft corresponding to shaft 34 of Fig. 1, and carried by it is a cam 58 which functions to operate valve 51 by moving rod 53 against the action of spring 55. On shaft 57 is a second cam 59 which through a rod 60 corresponding to rod 43 of Fig. 1, operates the engine throttle valve 61. A spring 62 serves to bias rod 60 to a position wherein throttle valve 61 is in closed or idling position and to hold the rod 60 in engagement with cam 59. Shaft 57 is provided with an operating means similar to that provided for shaft 34 in Fig. 1, pinion 63 on the end of the shaft being in mesh with rack 64 which is connected to a pedal 65. Cams 58 and 59 are arranged relatively to each other so that cam 59 first opens throttle valve 61 after which cam 58 moves valve 51 to decrease the area of bucket ring 13 available for the passage of exhaust gases.

In Fig. 3 the parts are shown in idling position. When pedal 65 is moved to increase the power and speed of the engine, cam 59 first gradually opens throttle valve 61. During this time all the exhaust gases from the engine pass through the buckets 13 of the turbine wheel but owing to the large area available for their passage there is but a small drop in pressure through the buckets, and but a small amount, if any, of supercharging takes place.

As the pedal 65 is moved further, valve 51 will be moved gradually over the bucket ring 13 to decrease the area available for the passage of the gases. As this occurs, the drop in pressure through the bucket ring will gradually increase and hence the energy imparted to the bucket wheel will increase. This means that the bucket wheel will be operated at higher and higher speeds and that supercharging will be effected.

The arrangement is such that valve 51 will have a total movement such that when in its innermost position, the desired maximum amount of supercharging will be obtained.

My invention, while it may be used with advantage in connection with constant speed engines, possesses particular utility when used in connection with variable speed engines such as automobile engines and aeroplane en-